United States Patent [19]
Vuillemin et al.

[11] Patent Number: 5,886,112
[45] Date of Patent: Mar. 23, 1999

[54] PROCESS FOR THE CONTINUOUS ANIONIC POLYMERIZATION OF AT LEAST ONE (METH)ACRYLIC MONOMER IN ORDER TO PRODUCE POLYMERS WITH A HIGH SOLIDS CONTENT

[75] Inventors: Bruno Vuillemin, Pau; Stéphane Nowe, Monein, both of France

[73] Assignee: Elf Atochem S.A., Puteaux, France

[21] Appl. No.: 665,521

[22] Filed: Jun. 17, 1996

[30] Foreign Application Priority Data

Jun. 15, 1995 [FR] France ................................. 95 07131

[51] Int. Cl.⁶ ...................................................... C08F 2/00
[52] U.S. Cl. ......................... 526/64; 526/317.1; 526/318; 526/318.4; 526/319; 526/329.7
[58] Field of Search ................... 526/64, 317.1, 526/318, 318.4, 319, 329.7

[56] References Cited

FOREIGN PATENT DOCUMENTS

| 0524054 | 1/1993 | European Pat. Off. . |
| 524054 | 1/1993 | European Pat. Off. . |
| 2305444 | 10/1976 | France . |

*Primary Examiner*—David W. Wu
*Attorney, Agent, or Firm*—Burns, Doane, Swecker & Mathis, L.L.P.

[57] ABSTRACT

The process consists in mixing, for a period tm less than the period of polymerization, in a micromixer, a flow Fm of monomer(s) to be (co)polymerized and a flow Fa of an initiator system leading to a propagation constant kp(t) greater than or equal to $500 \; l \; mol^{-1} \; s^{-1}$ and in injecting, in a polymerization reactor, a flow Fr resulting from the mixing of the flows Fm and Fa, the concentration of monomer(s) in the flow Fr being at least 10% by weight.

20 Claims, 1 Drawing Sheet

U.S. Patent    Mar. 23, 1999    5,886,112
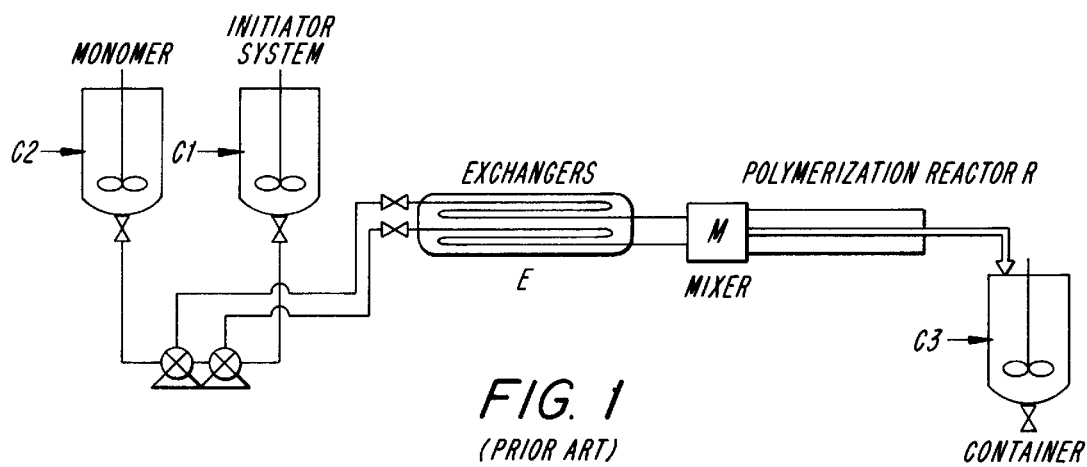
FIG. 1
(PRIOR ART)
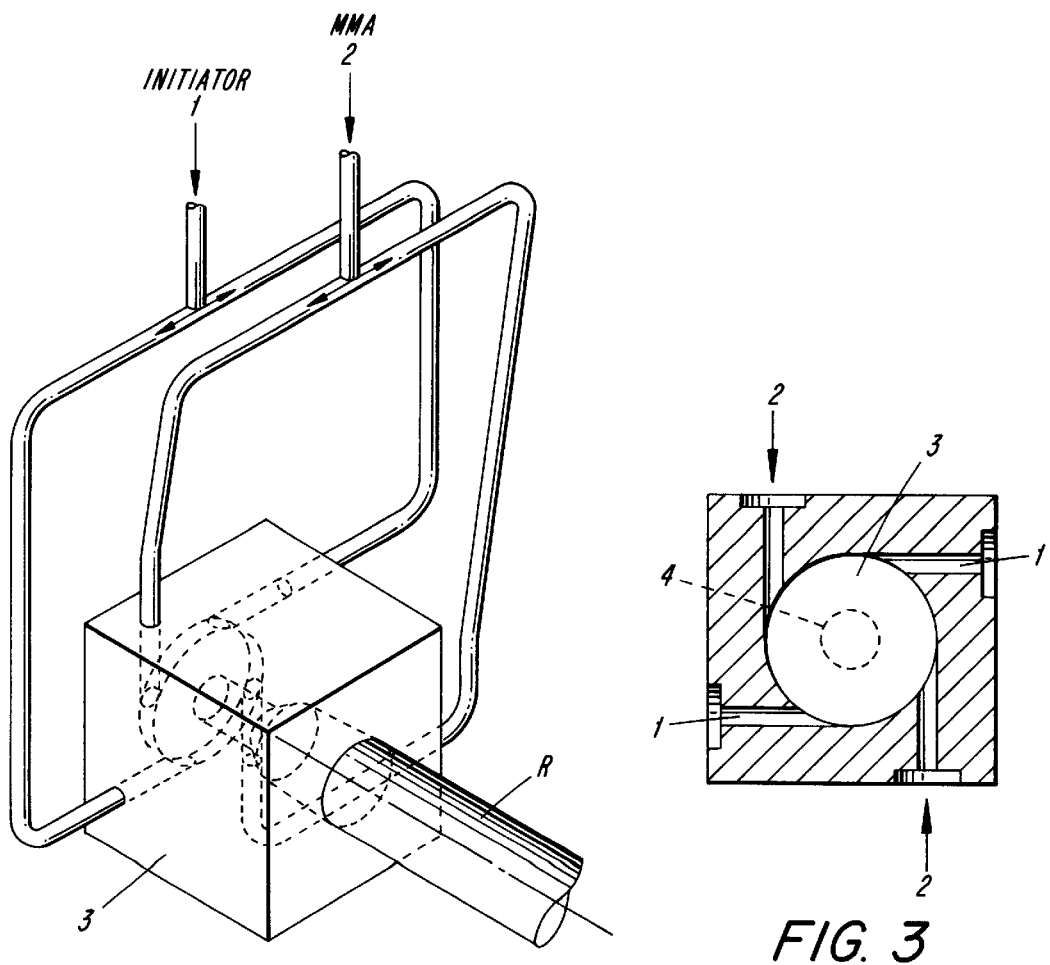
FIG. 2
FIG. 3

PROCESS FOR THE CONTINUOUS ANIONIC POLYMERIZATION OF AT LEAST ONE (METH)ACRYLIC MONOMER IN ORDER TO PRODUCE POLYMERS WITH A HIGH SOLIDS CONTENT

BACKGROUND OF THE INVENTION

1. Field of the Invention

The present invention relates to a process for the preparation of (meth)acrylic polymers or copolymers of at least one (moth)acrylic monomer by ultra-fast anionic polymerization leading to a polymer having controlled mass and polydispersity and a high solids content.

2. Description of Prior Art

The production of polymers with a high solids content has many advantages, in particular economic advantages (high concentration of polymer at the end of polymerization, reduced amount of solvent making the final polymer recovery easier).

The anionic polymerization of (meth)acrylic monomers is, in general, a fast polymerization, so much that it is more efficient to carry it out continuously. However, it is sometimes so fast that it is difficult to control.

To solve the problem of controlling the polymerization in order to obtain a "monodisperse" polymer, that is to say one with an $\overline{Mw}/\overline{Mn}$ ratio, or polydispersity, in the region of 1, Japanese patent application JP-A-60-56910 proposes to use a static mixer which makes it possible to mix the flow of monomer and the flow of initiator quickly and uniformly before the polymerization in a tubular reactor.

The intended aim of obtaining a polydispersity in the region of 1 is achieved. However, there are numerous drawbacks.

The appropriate concentration of the monomer(s) in the monomer flow is theoretically from 1 to 50% by weight. However, the viscosity of the solution of the polymer formed increases with the concentration, thus making the mixing operation difficult and consequently leading to an even wider molecular mass distribution of the final living polymer. The only two examples of this Japanese patent application use monomer solutions of low concentration, leading, after polymerization, to a medium having a low solids content (less than 10% by weight assuming a conversion of 100%).

Moreover, it is recommended in this Japanese patent application, in order to avoid side reactions, to maintain a polymerization temperature of -100° C. to +20° C. and, in particular, in the case of polar monomers such as (meth) acrylates, to perform the polymerization at a temperature which is preferably below -40° C. The polymerizations described in the examples are carried out at -78° C.

In addition, the polymerization reactor is preferably tubular, in order to facilitate the exchange of heat due to the exothermy of the reaction. This type of reactor is not, however, suitable for ultra-fast polymerization reactions since the polymerization time is too short to be able to exchange the heat due to the exothermic reaction of the polymerization.

It is known that the kinetics of anionic polymerization depend on the polymerization conditions, particularly on the reaction temperature and the concentration of the initiator system.

The teaching of the Japanese patent application mentioned above leads to the use of an initiator system and polymerization conditions which bring about a propagation constant which, at -40° C. (preferred upper temperature limit for the case of the methyl methacrylate monomer, according to this document), would be about 100 $l\,mol^{-1}\,s^{-1}$, that does not permit ultrafast reactions.

On the other hand, with an initiator system such as that described in document EP-A-524,054, that is to say a mixture of an initiator and a ligand of the alkoxyalkoxide type, the propagation constant for the reaction (kp(t)) is, for methyl methacrylate, greater than or equal to $10^4\,l\,mol^{-1}\,s^{-1}$ at 0° and $10^3\,l\,mol^{-1}\,s^{-1}$ at -40° C. With such an initiator, the reaction is thus ultra-fast, to such an extent that it is difficult to control even when it is performed continuously. (The propagation constants mentioned above, both for the case of the Japanese patent application and for the case of the document EP-A-524,054, were determined, by the Applicant, by the method of G. V. Schultz in European Polymer Journal—Vol. 10, pages 121–130—1974).

SUMMARY OF THE INVENTION

The Applicant Company has thus sought to The present invention relates to a process of anionic polymerization which allows, in particular, ultra-fast reactions, which may be carried out even without the need to work with tubular reactors and without being restricted to isothermal polymerization conditions so as to prevent side reactions, while controlling the molecular mass of the polymer obtained as well as its polydispersity such that it reaches a desired value, and while achieving a concentration of polymer obtained higher than those of the processes known to date, which is less than 10% by weight.

DESCRIPTION OF PREFERRED EMBODIMENTS

The process according to the invention, for the continuous preparation of (meth)acrylic homopolymers or copolymers from at least one (meth)acrylic monomer, includes mixing, for a time tm, a flow Fm comprising the monomer(s) to be (co)polymerized and a flow Fa of a (co)polymerization initiator system, the ratio of the flows Fm and Fa being kept constant, and then in continuously injecting, into a (co)polymerization reactor, the flow Fr resulting from the mixing of the flows Fm and Fa, and is characterized in that the mixing of the flows Fm and Fa is performed in a micro-mixer, using an initiator system leading to a propagation constant kp(t) which is greater than or equal to 500 $l\,mol^{-1}\,s^{-1}$, at an initial temperature To, the residence time, tm, in the micro-mixer being less than the (co)polymerization time and the concentration of monomer(s) in the flow Fr being greater than 10% by weight.

According to a preferred embodiment of the invention, the initial mixing temperature To is determined so as to allow a virtually adiabatic polymerization.

In accordance with the present invention, mixing of the reactants (monomer (s) and initiator system) is provided practically without any initiating in the micro-mixer, thereby making it possible subsequently to carry out the polymerization in any type of reactor, with a high monomer concentration (which leads to a final product with a high solids content), since a high viscosity is not reached during the mixing, and by setting the initial mixing (or polymerization) temperature it is possible, on the one hand, to work under adiabatic conditions and, on the other hand, to guarantee controlled initiation, and thus good control of the molecular mass and of the polydispersity within the limits selected and usually used for the material applications (extruded plates, granules for injected components, etc.), for example a polydispersity of less than 3.

Moreover, the present invention offers the additional advantage of leading, in the case of the manufacture of polymethacrylates, to a predominantly syndiotactic structure, even at high final polymerization temperatures.

It is possible, by the process according to the invention, to form homopolymers, random copolymers or block copolymers.

The monomers which may be (co)polymerized by the process of the invention are chosen in particular from the group comprising (meth)acrylic monomers, maleimides, vinylaromatics and dienes.

The term "(meth)acrylic monomer" as used above means a monomer chosen from the (meth)acrylates of respective formulae:

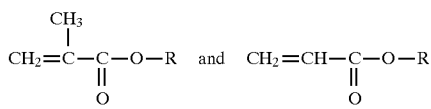

in which R is chosen from $C_1-C_{18}$ alkyl radicals which are linear or branched, and primary, secondary or tertiary, $C_5-C_{18}$ cycloalkyl radicals, alkoxy alkyl radicals, alkylthio alkyl radicals, aryl and arylalkyl radicals, wherein the groups alkyle have from 1 to 18 carbon atoms, these radicals being optionally substituted with at least one halogen atom and/or at least one hydroxyl group after protection of this hydroxyl group, the above alkyl groups being linear or branched; glycidyl, norbornyl and isobornyl (meth) acrylates and mono- and di ($C_1-C_{18}$ alkyl)-(meth) acrylamides.

Examples of useful methacrylates which may be mentioned are methyl, ethyl, 2,2,2-trifluoroethyl, n-propyl, isopropyl, n-butyl, sec-butyl, tert-butyl, n-amyl, isoamyl, n-hexyl, 2-ethylhexyl, cyclohexyl, octyl, isooctyl, nonyl, decyl, lauryl, stearyl, phenyl, benzyl, β-hydroxyethyl, isobornyl, hydroxypropyl and hydroxybutyl methacrylates. The preferred methacrylic monomer is methyl methacrylate.

Examples of acrylates of the above formula which may be mentioned are methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

The term "maleimide", as employed above, denotes an unsubstituted maleimide monomer or an N-substituted maleimide monomer of formula:

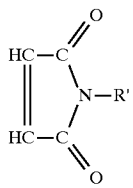

in which R' is an alkyl, arylalkyl, aryl or alkylaryl radical having from 1 to 12 carbon atoms. Non-limiting examples are: N-ethylmaleimide, N-isopropylmaleimide, N-n-butylmaleimide, N-isobutylmaleimide, N-tert-butylmaleimide, N-n-octylmaleimide, N-cyclohexylmaleimide, N-benzyl-maleimide and N-phenylmaleimide. The preferred maleimide is N-cyclohexylmaleimide.

The term vinylaromatic monomers refers to an aromatic monomer containing ethylenic unsaturation, such as styrene, vinyltoluene, alpha-methylstyrene, 4-methylstyrene, 3-methylstyrene, 4-methoxystyrene, 4-ethylstyrene, 3,4-dimethylstyrene, 3-tert-butylstyrene, 2,4-dichlorostyrene, 2,6-dichlorostyrene, 1-vinylnaphthalene, 2-vinylpyridine and 4-vinylpyridine.

The term diene monomer refers to a diene chosen from linear or cyclic, conjugated or non-conjugated dienes such as, for example, butadiene, isoprene and 1,3-pentadiene.

In the (co)polymerization of the above monomers, the initiator system is composed of an initiator and, optionally, a ligand, leading to a propagation constant of greater than or equal to 500 l mol$^{-1}$ s$^{-1}$.

As initiator, it is possible to use a monofunctional initiator of general formula (I):

in which:

M denotes an alkali metal or alkaline-earth metal; and $R^1$ denotes:
- an alkyl radical with a straight or branched chain, containing 2 to 6 carbon atoms; or
- an aryl radical with one or more rings, optionally substituted; or
- a $C_2-C_6$ alkenyl radical substituted with aryl or alkylaryl; or
- a linear or branched alkyl radical containing 1 to 6 carbon atoms, substituted with at least one phenyl group, or an anionic monofunctional initiator for (meth)acrylates chosen, for example, from α-lithioisobutyrates and metal amides, or alternatively a difunctional initiator of formula (II):

in which:

M is as defined above; and $R^2$ represents an aliphatic, cycloaliphatic or aromatic divalent organic radical or an organic radical containing at least one cycloaliphatic or aromatic group, it being possible for $R^2$ to contain substituents, and $R^3$ and $R^4$ each independently represent an aliphatic, cycloaliphatic or aromatic monovalent organic radical or an organic radical containing at least one cycloaliphatic or aromatic group, it being possible for $R^3$ and $R^4$ to contain substituents.

Examples of monofunctional initiators of formula (I) which my be mentioned are sec-butyllithium, u-butyllithium, fluorenyllithium, alpha-methylstyryllithium, 1,1-diphenylhexyllithium (DPHLi), diphenylmethyllithium or -sodium or -potassium and 1,1-diphenyl-3-methylpentyllithium.

Examples of difunctional initiators of formula (II) which may be mentioned are 1,1,4,4-tetraphenyl-1,4-dilithiobutane and 1,1,4,4-tetra-phenyl-1,4-disodiobutane.

It is also possible to use well-known difunctional initiator precursors, such as naphthalenelithium, naphthalenesodium, naphthalenepotassium and homologues thereof associated with diphenyl ethylene or α-methylstyrene.

Moreover, in a particularly preferred manner, the initiator as defined above is combined with at least one ligand consisting of an alkali metal alkoxide of formula (III) or (IV):

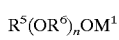 (III)

$$M^1(OR^6)_nOM^1 \qquad (IV)$$

in which:

M¹ represents an alkali metal;

R⁵ is a linear or branched alkyl radical having from 1 to 6 carbon atoms or an arylalkyl radical in which the alkyl residue is $C_1$–$C_6$, or an alkylyaryl radical in which the alkyl group has from 1 to 6 carbon atoms;

R⁶ is a linear or branched alkylene radical having from 2 to 4 carbon atoms;

n is the integer 1, 2 or 3.

Example of such alkoxides which may be mentioned are those in which the radical R⁵ is a methyl, ethyl, butyl or benzyl radical, R⁵ advantageously being the methyl radical, and R⁶ is the ethylene, propylene, butylene or isopropylene radical, R⁶ preferably being the ethylene radical. M¹ is lithium, sodium or potassium and preferably represents lithium.

Specific examples are as follows:

$CH_3(OCH_2CH_2)OLi$ $CH_3(OCH_2CH_2)_2OLi$ $CH_3(OCH_2CH_2)_3OLi$ $nBu(OCH_2CH_2)_2OLi$ $Et(OCH_2CH_2)_2OLi$ $Li(OCH_2CH_2)_2OLi$ $Li(OCH_2CH_2)_3OLi$

The alkoxides of formulae (III) and (IV) are prepared, for example, by reaction of $R^5(OR^6)_nOH$ or $H(OR^6)_nOH$ respectively with any base whose pKa is higher than the pKa of the $R^5(OR^6)_nOM^1/R^5(OR^6)_nOH$ couple or of the $M^1(OR^6)_nOM^1/H(OR^6)_nOH$ couple. Thus, the lithium alkoxides may be prepared by reaction with lithium metal or by reaction with an organometallic lithium compound in a polar or apolar solvent.

The molar ratio of the ligand of formula (III) or (IV) to the initiator in the initiator system as defined above may vary within a very wide range. The amount of ligand (III) or (IV) must be sufficient to allow the formation of a complex with the polymerization active centre and thus to stabilize the latter. The amount of ligand (III) or (IV) depends on the initiator chosen and on the monomers to be (co)polymerized. The ligand (III) or (IV)/initiator molar ratio is generally between 1 and 50. In order to obtain the best results, this ratio is preferably between 1 and 10.

The monomer(s) may be in solution in at least one polar or non-polar, aprotic solvent chosen from aromatic solvents such as benzene, toluene and ethylbenzene and solvents such as tetrahydrofuran, diglyme, tetraglyme, ortho-terphenyl, biphenyl, decalin, tetralin or dimethylformamide. The initiator and the associated ligand are in solution in a solvent of the same type.

In accordance with the process according to the invention, a temperature $T_0$ is chosen bearing in mind the virtually adiabatic conditions and the desired final temperature. $T_0$ may be between −100° and +100° C., preferably between −70° and +20° C.

According to the invention, in the combined flow Fr, the initiator concentration is generally between $10^{-4}$ and $10^{-1}$ mol/l and the concentration of monomer(s) may advantageously be from 10 to 100% by weight, in particular from 30% to 70% by weight.

In the present description, the term "polymerization time" refers to the duration of the polymerization, which may be considered as starting when the flows Fm and Fa are injected in the micro-mixer and as ending when virtually no more exothermy due to the polymerization reaction is observed. It is thus possible readily to determine this polymerization time, as is well known, from the propagation constants and the reaction conditions (for example initiator concentration, temperature).

According to the invention, any micro-mixer allowing a very short residence time and necessarily a residence time which is less than the polymerization time may be used, for example a micro-mixer of cyclone type for one with tangential jets) or of the type with impact jets, for example the micro-mixers used in RIM (Reaction Injection Moulding) polymerizations.

Polymerization reactors which may be used are a tubular reactor, a continuously stirred reactor, a thin film reactor, a spraying tower, a degassing extruder or any other installation in which degassing is carried out. When the reactor is of the spraying tower or degassing extruder type or any other type of installation in which degassing takes place, the polymer is recovered by devolatilization of the residual monomers and solvents in the reactor itself.

As mentioned above, under the conditions of the invention, the rate of polymerization is ultra-fast. Heat exchange is thus difficult. In order to facilitate it, any reactor allowing control of the polymerization temperature by using the latent heat of evaporation of the volatiles present in the medium may be employed.

Moreover, constant flow ratios of monomer(s) and of initiator are generally maintained by any suitable system and, for example, by means of the use of piston pumps or membrane pumps, assisted by a pulse damper system and coupled together in order to ensure pulses in phase or alternatively by means of the use of means for controlling the flows, such as control valves.

As mentioned above, the (co)polymerization is performed under adiabatic condition, which is advantageous since there is no need to supply energy during the polymerization. Moreover, since the final temperature is higher, it is easier to degas the (co)polymer solution obtained, and the lower viscosity of this solution permits easier handling and transportation. In addition, the speed of the process allows higher productivity.

The present invention thus makes it possible to prepare block copolymers: the first polymer block is prepared as described above; this is a living polymer block; in a second micro-mixer, located before the polymerization reactor, a flow of a second monomer is injected, the living polymer already formed acting as a macro-initiator for the polymerization of this second monomer, and, where appropriate, a flow of a third monomer is then injected into a third micro-mixer, the living diblock copolymer already formed acting as a macro-initiator for the polymerization of this third monomer.

In order to prepare a block polymer, it is thus possible to use as initiator a living polymer formed independently of the present process from (meth)acrylic, vinylaromatic or conjugated diene monomers, for example, and to inject it into the first micro-mixer instead of the solution of the initiator system mentioned above.

In order to obtain the desired (co)polymers from living (co)polymers, the latter are deactivated by reaction with a source of protons consisting in particular of an alcohol, water or a protic acid; and, where appropriate, the (co)polymer obtained is transesterified or hydrolysed in acidic medium.

The (co)polymers according to the invention are obtained with concentrations in the polymerization medium of greater than or equal to 10% by weight; they have a number-average molecular mass generally of between 5000 and 500,000 and a polydispersity of less than 3.

In the case where the monomer is methyl methacrylate, the poly(methyl methacrylate) obtained generally has a syndiotacticity of greater than 65%.

EXAMPLE 1

(Comparative)

The polymerization installation used is that represented schematically in FIG. 1: a solution of the initiator system is prepared in a container C1 and a solution of the monomer in a container C2. Each of these two flows is directed to an exchanger E in order to be brought to the initial polymerization temperature $T_o$; the two flows are then directed to a mixer M, which in this example is a static mixer, as described in patent application JP 60-56910, and then to the polymerization reactor R, which is a conventional tubular reactor.

The methyl methacrylate (MMA) used is purified by passing through molecular sieves and then through alumina; the toluene used is purified over molecular sieves.

A solution in toluene of the initiator system DPHLi/CH$_3$OCH$_2$CH$_2$OLi of molar ratio 1/10, containing $1.7\times10^{-2}$ mol/l of DPHLi, is prepared in the container C1. A solution of MMA at a concentration of 312.5 g/l in toluene is stored in the container C2. The target level of MMA in the polymer solution is 21% by weight. The flow of the MMA solution of 4 l/h and the flow of the initiator system solution of 2 l/h are brought to a temperature of $-40°$ C., by means of the exchangers E, and are then mixed by means of the static mixer M. The solutions are conveyed by piston pumps, resistant to 300 bar, placed upstream of the mixer. The installation of these pumps does not allow a constant flow ratio.

The residence time in the static mixer is 1.6 s and the polymerization time is 0.5 s.

The polymer solution obtained is collected in the container C3, where it is deactivated by addition of an MeOH/acetic acid solution. The degree of conversion, determined by measuring the level of residual monomer by gas chromatography, is greater than 99%.

The characteristics of the PMA synthesized are:
$\overline{Mn}$=58,000
$\overline{Mn}/\overline{Mn}$=3.9
The propagation constant kp ($-40°$ C.) is about $9\pm2\times10^3$ l mol$^{-1}$ s$^{-1}$.

The use of a static mixer is not suited to this polymerization process and leads to a polymer of high polydispersity. The reaction conditions lead to a mixing time which is longer than the polymerization time.

EXAMPLE 2

(Comparative)

The polymerization is carried out as described in Example 1, except that the target PMMA concentration is 30%, the result of which is that the MMA concentration in the monomer flow is 446 g of MMA per litre and the initiator concentration in the second flow is $2.4\times10^{-2}$ mol of DPHLi per liter During establishment of the conditions in the reactor, a delivery pressure of the pumps of greater than 200 bar is observed, which actuates the system for protecting the piston pumps. The polymerization is stopped. The absence of control of the molecular mass distribution leads to the synthesis of a proportion of very high mass, which greatly increases the viscosity of the medium.

The fact of having increased the solids content reduced the control of the polymerization, which could not be obtained. The use of a static mixer is not possible under these conditions.

EXAMPLE 3

(Comparative)

The process is performed as in Example 2, except that the initial temperature $T_o$ is $-5°$ C. The residence time in the static mixer is 1.6 s. The polymerization time is about 0.45 s.

The degree of conversion measured after polymerization is 98.7%.

The characteristics of the PMMA synthesized are:
$\overline{Mn}$=37,000
$\overline{Mn}/\overline{Mn}$=7.2
The propagation constant kp ($-5°$ C.) is about $25\pm5\times10^3$ l mol$^{-1}$ s$^{-1}$.

The process was performed as in Example 2, but with the temperature being increased so as to decrease the final viscosity, which is very temperature-dependent.

It was possible to obtain a polymerization, but the non-constant flows and the long duration of the mixing led to a very high polydispersity.

EXAMPLE 4

(Comparative)

The process is performed as in Example 1, except that the piston pumps are coupled together such that they are perfectly in phase, in order to conserve a perfectly constant flow ratio.

The characteristics of the PMMA synthesized are:
$\overline{Mn}$=60,000
$\overline{Mw}/\overline{Mn}$=3.4
The fact of working with constant flow ratios made it possible to improve the polydispersity which remains, however, too high.

EXAMPLES 5 to 12

The static mixer of Example 1 is replaced by a micro-mixer module composed of a flow separator which divides the flow (1) of initiator system and the flow (2) of MMA into two, the resulting four flows supplying a tangential-flow micro-mixer (3) (of cyclone type) connected to a reactor R, as represented in FIG. 2.

FIG. 3 is a transverse sectional view of the micro-mixer of FIG. 2. The inlets (1) and (2) respectively allow the introduction of the flows of initiator system and of monomer; the mixing takes place in the chamber (3) of the micro-mixer and the combined flow is directed towards the tubular reactor whose cross-section (4) is represented in dotted lines.

In order to carry out Examples 5 to 11, a micro-mixer is used whose mixing chamber has a volume of 0.3 ml, and in order to carry out Example 12, a micro-mixer is used whose mixing chamber has a volume of 3 µl.

Polymerization of the PMMA is carried out as in Example 1. The flow of monomer/flow of initiator system ratio is kept constant by using coupled, in-phase piston pumps. The polymerizations carried out in the tubular reactor after the micro-mixer are adiabatic.

The characteristics of the process and those of the PMMA synthesized for each of these Examples 5 to 12 are reported in Table 1 below.

In these examples, the polymerization time is longer than the mixing time and polydispersities which are all less than 2.5 and a low pump delivery pressure are then obtained.

Comparison of Examples 2 and 5 shows that the polymerization may be carried out to 30% polymer when the flow ratios are constant and the mixing time is shorter than the polymerization time.

Examples 5 to 7 show that even by varying the polymerization temperatures, the reaction is well controlled.

It may also be noted that, when the mixing time is very short, the polydispersity is very low (Example 12).

In addition, even when the final temperature is very high (Example 11), the polymerization is quantitative and the polydispersity and molecular masses are controlled.

This process thus makes it possible to work at polymerization temperatures which are usually inaccessible and which lead to high solids contents.

With an initiator system leading to a very high propagation constant (kp), thus very much higher than the propagation constant of the side reactions, as is the case in the invention, a well controlled polymerization may be obtained.

initial polymerization temperature is −40° C. The final polymerization temperature is 0±5° C.

Results $\overline{Mn}$=45,200

Ip=1.45

Conversion=99.8%

EXAMPLE 14

Synthesis of poly(tert-butyl acrylate)-b-PMMA block copolymer.

The process is performed as in Example 5. However, the initiator used in this example is the living tert-butyl acrylate polymer prepared in Example 13. The concentration of MMA monomer in the total flow is 15% by weight. The initial polymerization temperature is the final polymerization temperature of Example 13, i.e. 0° C. The final polymerization temperature is 51±5° C.

Results $\overline{Mn}$=71,000

Ip=2.05

Conversion=99.5%

TABLE 1

| Examples | 5 | 6 | 7 | 8 | 9 | 10 | 11 | 12 |
|---|---|---|---|---|---|---|---|---|
| Ligand/initiator molar ratio | 5 | 5 | 5 | 5 | 5 | 4 | 5 | 5 |
| Initiator concentration in the total flow [Io] × $10^3$ (mol/l) | 8.86 | 8.86 | 10.4 | 10.4 | 8.86 | 8.86 | 17 | 8.61 |
| Monomer concentration in the total flow (% by weight) | 30 | 30 | 35 | 35 | 30 | 30 | 40 | 20 |
| Residence time in the micro-mixer (seconds) | 0.05 | 0.05 | 0.05 | 0.05 | 0.05 | 0.05 | 0.11 | 5 × 10$^{-4}$ |
| Total flow (Kg/h) | 24 | 24 | 24 | 24 | 24 | 24 | 11 | 24 |
| Polymerization time (seconds) | 0.20 +/− 0.05 | 0.2 +/− 0.05 | 0.18 +/− 0.05 | 0.18 +/− 0.05 | 0.18 +/− 0.05 | 0.30 +/− 0.06 | 0.25 +/− 0.05 | 0.25 +/− 0.05 |
| Initial polymerization temperature To (°C.) | −40 | −29 | −26 | −20 | −39 | −21 | −13 | −21 |
| Final polymerization temperature recorded (°C.) | 59 +/− 5 | 71 +/− 5 | 88 +/− 5 | 91 +/− 5 | 62 +/− 5 | 80 +/− 5 | 96 +/− 5 | 44 +/− 5 |
| Mn | 41,100 | 41,600 | 38,000 | 37,400 | 41,600 | 42,200 | 36,600 | 49,900 |
| Mw/Mn | 1.65 | 2 | 1.84 | 2.02 | 1.82 | 2.44 | 2.24 | 1.48 |
| Conversion (%) | 99.8 | 99.0 | 96.4 | 95.5 | 99.6 | 98.2 | 92.2 | 99.8 |
| Tacticity (% of syndiotactic triads) | 72 | 72 | 71 | 70 | 74 | 69 | 66 | 73 |

EXAMPLE 13

Synthesis of tert-butyl acrylate homopolymers

The process is performed as in Example 5 with the following differences:

The methyl methacrylate is replaced by tert-butyl acrylate. The initiator concentration in the total flow is 4.5×10$^{-3}$ mol/l. The monomer concentration in the total flow is 15% by weight. The residence time in the micro-mixer is 0.1 s. The total flow is 12 kg/h. The

EXAMPLE 15

Synthesis of polybutadiene-b-PMMA block copolymer

The process is performed as in Example 14, but using, as initiator, the living polybutadiene prepared in the following way:

To 15 l of pre-purified toluene are added, at 0° C., 70×10$^{-3}$ mol of sec-butyllithium and then 1350 g of butadiene. The mixture is left to polymerize for 24 h.

70×10⁻² mol of lithium methoxyethoxide and 70×10⁻³ mol of diphenylethylene are then added. A red colour forms. After 15 min, the solution of living polybutadiene (PBD), useful as macro-initiator, is ready: $\overline{Mn}$=25,000 (PBD standard); Ip=1.17.

The final temperature after the polymerization of the PMMA block is 48±5° C. The degree of conversion is 99.6%.

Results for the copolymer $\overline{Mn}$=104,000 (PMMA standard)

Ip=1.96

EXAMPLE 16

The process is performed as in Example 15, but, in order to prepare the macro-initiator polymer, a 50/50 mixture by weight of butadiene and styrene is used instead of the butadiene.

The final polymerization temperature, after formation of the PMMA block, is 46±5° C. The degree of conversion is 99.6%. The macro-initiator and the final copolymer are characterized by GPC/PMMA standard—Macro-initiator: copoly BD/styrene: $\overline{Mn}$=35,000; Ip=1.26.

Final copolymer=$\overline{Mn}$=89,000

Ip=2.55

We claim:

1. A process for the continuous preparation of (meth)acrylic homopolymers or copolymers from at least one (meth)acrylic monomer, comprising mixing a flow Fm which comprises monomer(s) to be (co)polymerized and a flow Fa which comprises a (co)polymerization initiator system, the ratio of the flows Fm and Fa being kept constant; and then continuously injecting, into a (co)polymerization reactor, a flow Fr resulting from the mixing of the flows Fm and Fa, wherein the mixing of the flows Fm and Fa is performed in a micro-mixer using an initiator system leading to a propagation constant kp(t) which is greater than or equal to 500 l mol⁻¹ s⁻¹ at an initial temperature $T_o$, the residence time in the micro-mixer is less than the (co)polymerization time and the concentration of monomer(s) in the flow Fr is greater than 10% by weight.

2. The process according to claim 1, wherein the monomer(s) to be (co)polymerized is selected from the group consisting of methacrylic monomers, acrylic monomers, maleimides, vinylaromatics and dienes.

3. The process according to claim 1, wherein the initiator is a monofunctional initiator of formula (I):

$$R^1—M \quad (I)$$

in which:

M denotes an alkali metal or alkaline-earth metal; and

R¹ denotes:

an alkyl radical with a straight or branched chain, containing 2 to 6 carbon atoms; or an aryl radical with one or more rings, optionally substituted; or a C₂–C₆ alkenyl radical substituted with aryl or alkylaryl; or a linear or branched alkyl radical containing 1 to 6 carbon atoms, substituted with at least one phenyl group, or an anionic monofunctional initiator for (meth)acrylates chosen from α-lithioisobutyrates and metal amides, or alternatively a difunctional initiator of formula (II):

in which:

M is as defined above; and

R² represents an aliphatic, cycloaliphatic or aromatic divalent organic radical or an organic radical containing at least one cycloaliphatic or aromatic group, it being possible for R² to contain substituents, and R³ and R⁴ each independently represent an aliphatic, cycloaliphatic or aromatic monovalent organic radical or an organic radical containing at least one cycloaliphatic or aromatic group, it being possible for R³ and R⁴ to contain substituents.

4. The process according to claim 2, wherein the initiator is combined with at least one ligand of an alkali metal alkoxide of formula (III) or (IV):

in which:

M¹ represents an alkali metal;

R⁵ is a linear or branched alkyl radical having from 1 to 6 carbon atoms or an arylalkyl radical in which the alkyl residue is C₁–C₆, or an alkylaryl radical in which the alkyl group has from 1 to 6 carbon atoms;

R⁶ is a linear or branched alkylene radical having from 2 to 4 carbon atoms;

n is the integer 1, 2 or 3.

5. The process according to claim 4, wherein the ligand/initiator molar ratio is between 1 and 50.

6. The process according to claim 5, wherein the ligand/initiator molar ratio is between 1 and 10.

7. The process according to claim 1, wherein said process is conducted at a temperature $T_o$ of between −100° C. and +100° C.

8. The process according to claim 7, wherein said process is conducted at a temperature $T_o$ of between −70° and +20° C.

9. The process according to claim 1, wherein the initiator concentration in the combined flow is between 10⁻⁴ and 10⁻¹ mol/l.

10. The process according to claim 1, wherein the concentration of monomer(s) in the combined flow is from 30 to 70% by weight.

11. The process according to claim 1, wherein a solvent or mixture of solvents is present in said flow Fr.

12. The process according to claim 11, wherein said solvent is selected from the group consisting of benzene, toluene, ethylbenzene, tetrahydrofuran, diglyme, tetraglyme, ortho-terphenyl, biphenyl, decalin, tetralin, dimethylformamide, and mixtures thereof.

13. The process according to claim 1, wherein the flow Fm comprises the monomer(s) in the pure state.

14. The process according to claim 1, wherein the micro-mixer is a cyclone micro-mixer, a tangential jet micro-mixer or an impact-jet micro-mixer.

15. The process according to claim 1, wherein the (co)polymerization reactor is a tubular reactor, a continuously stirred reactor, a thin film reactor, a spraying tower or a degassing extruder.

16. The process according to claim 1, wherein a second monomer is injected into a second micro-mixer such that polymer already formed acts as an initiator for the polymerization of this second monomer.

17. The process according to claim 16, wherein a flow of a third monomer is then injected into a third micro-mixer such that a living diblock copolymer already formed acts as an initiator for the polymerization of this third monomer.

18. The process according to claim 1, wherein a living polymer prepared from a (meth)acrylic, vinylaromatic or conjugated diene monomer is injected, as initiator, into the micro-mixer.

19. The process according to claim 1, wherein the (co)polymer obtained is deactivated by reaction with a source of protons.

20. The process according to claim 1, wherein the monomer used is methyl methacrylate and the polymer formed is a poly(methyl methacrylate) having a syndiotacticity of greater than 65%.

* * * * *